G. W. HEATH.
Horse Hay Fork.
No. 88,477.
Patented March 30, 1869.
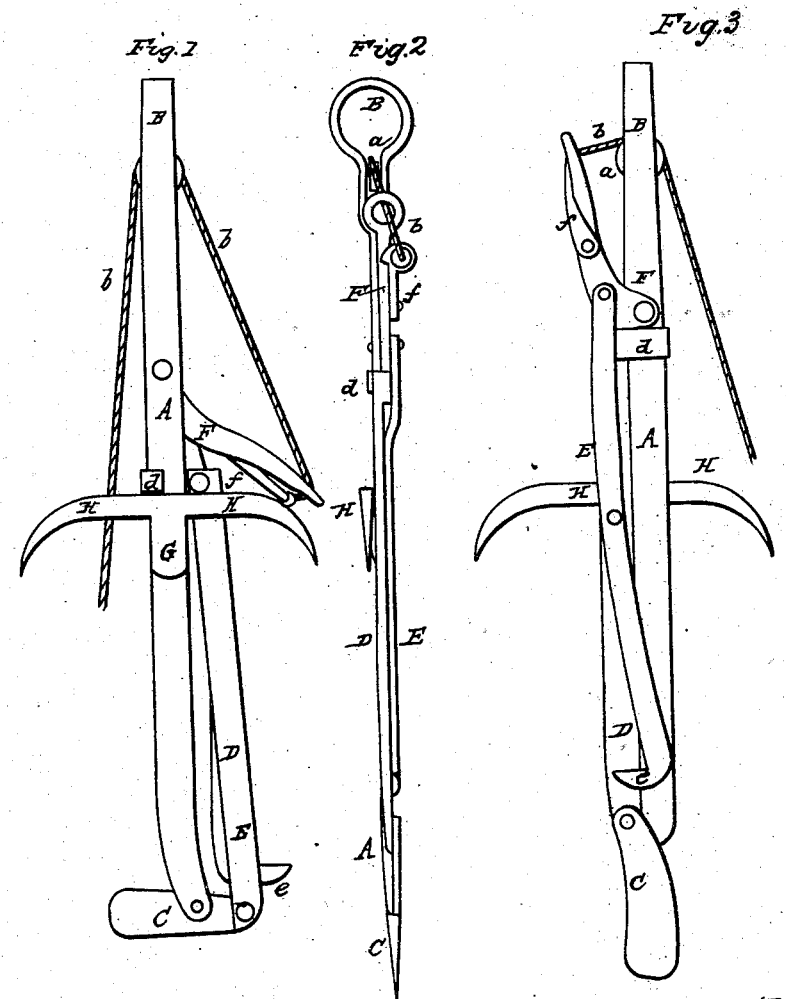

United States Patent Office.

GEORGE W. HEATH, OF BURLINGTON, PENNSYLVANIA.

Letters Patent No. 88,477, dated March 30, 1869.

IMPROVEMENT IN HORSE HAY-FORKS.

The Schedule referred to in these Letters Patent and making part of the same.

*To all whom it may concern:*

Be it known that I, GEORGE W. HEATH, of Burlington, in the county of Bradford, and in the State of Pennsylvania, have invented a certain new and useful Improvement in Horse Hay-Fork; and do hereby declare that the following is a full, clear, and exact description thereof, reference being had to the accompanying drawings, and to the letters of reference marked thereon.

The nature of my invention consists in the construction and operation of a new and improved horse hay-fork, as more fully hereinafter described.

In order to enable others skilled in the art to make and use my invention, I will now proceed to describe its construction and operation, referring to the annexed drawings, which form a part of this specification, and in which—

Figure 1 is a rear elevation;

Figure 2, a side elevation; and

Figure 3, a front elevation.

A represents a metal bar, the upper part of which forms the handle of the hay-fork, with a ring, B, in its end, and a pulley, $a$, in the same, over which the rope $b\ b$ runs.

To the lower end of the bar A, the point, or fluke C is pivoted, the upper end of which is attached to a side-bar, D, which extends up along the side of the bar A, and closes around the same, by means of the angular bar $d$, at its upper end.

The lower end of the point C is chisel-shaped, so as to cut through the hay.

On the rear side of the bar A, is a cross-bar, G, with crooked forks, H H, extending, one on each side of the bar A.

On the front of the side-bar D, is another bar, E, pivoted, which bar is provided with a hook, $e$, extending on the opposite side of where the point C extends, when raised.

The upper end of this bar E is attached to the lever F, which is pivoted on the upper part of the bar A, in such a manner, that when the hay-fork is ready to be thrust into the hay, as shown in fig. 3, and the lever F is depressed, the arm, or bar E is lowered, the hook $e$ moving outward, the bar at the same time sliding the side-bar D down, turning the point C outward, so as to hold the hay on the fork, the armed cross-bar G preventing the hay from coming too high up on the fork.

On the lever F, is a latch, $f$, which catches on the angular bar $d$, to prevent the fork from being tripped or unlatched, till required.

The rope $b\ b$, passing over the pulley $a$, runs through a ring on the end of the lever F, and is fastened to the end of the latch $f$.

Having thus fully described my invention,

What I claim as new, and desire to secure by Letters Patent, is—

1. The arrangement of the bar A, bar D, point C, hooked bar E, cross-bar G, and its forks H H, when constructed and operating as specified.

2. The combination of the lever F, the latch $f$, and angular bar $d$, constructed and operating substantially as and for the purposes herein set forth.

In testimony that I claim the foregoing, I have hereunto set my hand, this 23d day of May, 1868.

G. W. HEATH.

Witnesses:
H. S. HUNTLEY,
THOS. SMITH.